Dec. 22, 1925.  
V. J. CLARK  
1,566,737  
COMPENSATOR  
Filed May 7, 1923
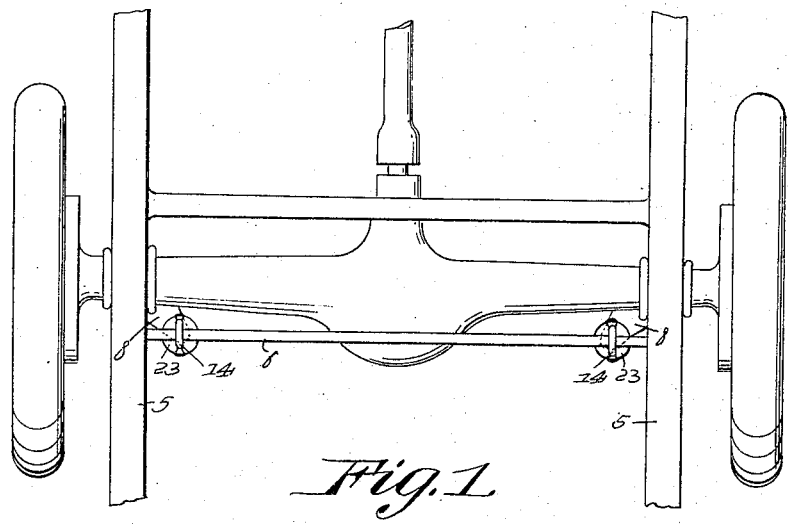
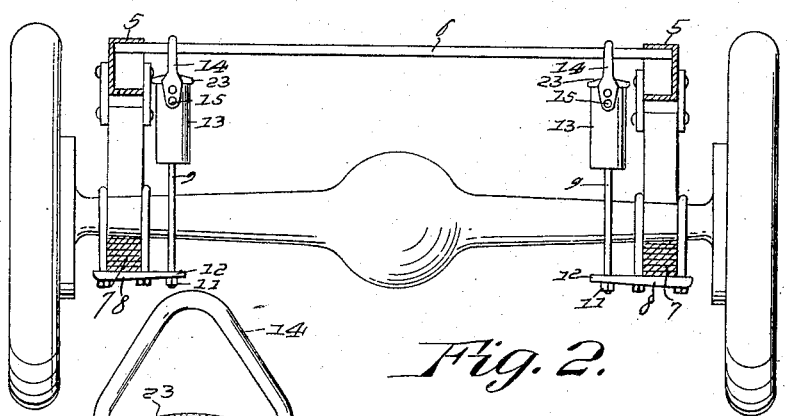

Patented Dec. 22, 1925.

1,566,737

UNITED STATES PATENT OFFICE.

VALLA J. CLARK, OF ST. PETERSBURG, FLORIDA.

COMPENSATOR.

Application filed May 7, 1923. Serial No. 637,342.

*To all whom it may concern:*

Be it known that I, VALLA J. CLARK, a citizen of the United States of America, and resident of St. Petersburg, in the county of Pinellas and State of Florida, have invented certain new and useful Improvements in Compensators, of which the following is a specification.

This invention relates to compensating springs for vehicles, it being understood that the invention is not restricted in its use to any particular type of spring vehicle, although it is of prime importance as associated with automobiles, trucks and the like.

It is an object of this invention to substitute spring load for actual load, in other words, the springs will approximately compensate for the lack of load in proportion to the amount of load lacking, automatically adjusting themselves, thus compelling vehicle springs to act as if the vehicle were loaded to capacity.

The mechanism of the invention acts to compel the vehicle springs to relieve the vehicle from the force of road shocks and forestalls any necessity for so-called shock absorbers or rebound checker as it prevents the shock that causes the rebound.

It is a further object of this invention to provide novel means for modifying the action of the springs of vehicles when the vehicle is carrying less than the maximum load, the said invention being effective to hold the springs of the vehicle under the conditions which they would assume when the vehicle was loaded to its capacity. By the arrangement just stated, the vehicle will ride more comfortably, absorb jars and vibrations due to uneven roadbeds or slight obstructions which the wheel might encounter, so that the occupants would be relieved of the shock which would be otherwise transmitted to them.

It is a still further object of this invention to produce a spring having the characteristic above indicated, and having furthermore a tensioning device or spring whereby when the load on the vehicle becomes sufficiently great to relieve the spring that has adjusted the vehicle spring for the load, the said spring will be maintained in normal position centered with respect to the mechanism with relation to which it is assembled.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of the rear axle of an automobile, showing a device embodying the invention applied thereto;

Figure 2 illustrates a sectional view of the spring with the device in elevation; and Figure 3 illustrates a sectional view of the compensator.

In these drawings, 5 denotes the side members of a chassis frame to which a rod 6 is secured in any appropriate way, the rod serving as a suspension or support for the compensating mechanism, as will presently appear.

7 denotes the springs of an ordinary automobile associated with the axle and other parts in a conventional manner, and the description of the details of this arrangement need not, it is thought, be enlarged upon.

In installing the device of this invention, the ordinary shackle plate may be dispensed with and a substitute shackle plate 8 supplied having an extension forming an arm to which a bolt 9 similar to a piston rod, is adjustably secured by the nuts 10 and 11. The plate 8 is channeled or has side flanges 12 in order that the arm will be comparatively strong considering the amount of material employed in its manufacture. It will be understood, of course, one or more compensating springs are provided for each side of the automobile, but as a description of the mechanism on one side will suffice as a disclosure of an understanding of the invention by one skilled in the art, the description will refer to one of the compensating springs.

A cylinder or casing 13 has a bail or hanger 14 with its ends connected to the side of the cylinder by fastenings 15 such as rivets or the like, and the said bail or hanger is suspended on the rod 6. The bolt 9 projects through the bottom of the casing and terminates at its upper end in a head 16 that rests on a washer 17. The washer rests on the flange 18 of a sleeve 19 and is engaged by a retaining spring 20 within the sleeve. The bottom of the sleeve has an inturned flange 21 on which the lower end of the spring 20 bears, and when the parts are in the normal positions shown in Fig. 3, the spring 20 is under compression.

The sleeve and that portion of the bolt within the casing are embraced by a compensating spring 22 conical in form with the upper end resting against the flange 18 of the sleeve and the lower end resting on the bottom of the casing or base plate 22ª.

The mechanism within the casing is protected from the accumulation of dust or access of foreign substances thereto by a cover 23 having a flange 24 with spring fingers that serve to retain the cover in place by reason of the frictional engagement of the said springs with the inner wall of the casing, and access to the interior of the casing may be had by the removal of the cover.

Means are provided for adjusting the tension of the spring through the use of the nuts 10 and 11 and therefore, the compensating spring can be made to operate efficiently with automobile springs of different types.

When a mechanism embodying the invention is installed in an automobile, the nuts 10 and 11 are adjusted to compress the springs 22 to cause them to exert a pull which will produce a maximum load on the springs, it being understood that two or more of these compensators are employed, one or more on each side of the automobile, and by this means, the compensators can be adjusted to springs of different strengths.

After the vehicle is loaded to the maximum capacity, or to a degree where the tension of the springs 22 is overcome, the springs 20 will expand to compensate for lost motion and to retain the parts in the normal positions in which they are shown in Fig. 3, so that the spring 22 will again function when the load has been removed to an extent that would cause the spring 22 to be under compression.

I claim:

1. In a load compensator, a casing having a bail, means for suspending the casing on a plane above a vehicle spring, an element projecting from the bottom of the casing and slidable therein, means for anchoring the lower end of the element to a fixed part of the vehicle, a flanged sleeve within the casing through which the element projects, a washer above the flanged sleeve engaging the element for holding the parts in assembled relation to each other, a spring within the flanged sleeve having one end bearing against a rigid part of the sleeve and the other end against the said washer, and a spring encircling the flanged sleeve and that portion of the member within the casing, the said spring bearing against the flange of the sleeve and bottom of the casing, and means for adjusting the element to compress the last mentioned spring.

2. In a compensator, a casing having means for its suspension in a plane above a vehicle spring, a bolt projecting through the bottom of the casing to the interior thereof, an arm having its lower end anchored with relation to the spring of the vehicle, a sleeve through which the said bolt projects, a washer interposed between the head of the bolt and the said sleeve, a spring in the sleeve exerting pressure on the washer, a spring within the casing exerting upward pressure on the sleeve, and means for adjusting the pull of the bolt against the last mentioned spring.

3. In a compensator, a casing having means for its suspension in a plane above a vehicle spring, a bolt projecting through the bottom of the casing to the interior thereof, an arm having its lower end anchored with relation to the spring of the vehicle, a sleeve through which the said bolt projects, a washer interposed between the head of the bolt and the said sleeve, a spring in the sleeve exerting pressure on the washer, a spring within the casing exerting upward pressure on the sleeve, means for adjusting the pull of the bolt against the last mentioned spring, and a removable cover for the casing.

4. In a compensator, a casing, a bolt projecting through the bottom of the casing to the interior thereof, a flanged sleeve within the casing, a spring within the sleeve, the said sleeve having a flange against which one end of the spring bears, the said spring exerting force against the head of the bolt, a spring within the casing operative to force the sleeve normally upward, and means for anchoring the bolt stationarily with relation to the spring of a vehicle.

5. In a compensator, a casing, a bolt projecting through the bottom of the casing to the interior thereof, a flanged sleeve within the casing, a spring within the sleeve, the said sleeve having a flange against which one end of the spring bears, the said spring exerting force against the head of the bolt, a spring within the casing operative to force the sleeve normally upward, a plate having an extension forming an arm anchored in stationary relation to a spring of a vehicle, and means for connecting the bolt to the arm.

VAJLA J. CLARK.